United States Patent [19]

Famili

[11] Patent Number: 5,719,231

[45] Date of Patent: Feb. 17, 1998

[54] PROCESS FOR MANUFACTURING POLYVINYL ALCOHOL POLYMERS CONTAINING ACETOACETIC ESTER GROUPS

[75] Inventor: Amir Famili, Orefield, Pa.

[73] Assignee: Air Products and Chemicals, Inc., Allentown, Pa.

[21] Appl. No.: 653,374

[22] Filed: May 21, 1996

[51] Int. Cl.⁶ ..................................................... C08F 8/00
[52] U.S. Cl. ................................................. 525/61; 525/386
[58] Field of Search ........................................ 525/61, 386

[56] References Cited

U.S. PATENT DOCUMENTS

| | | | |
|---|---|---|---|
| 2,474,095 | 6/1949 | Cornthwaite et al. | 525/61 |
| 2,536,980 | 1/1951 | Jones et al. | 525/61 |
| 4,350,788 | 9/1982 | Shimokawa et al. | 525/61 X |
| 4,804,715 | 2/1989 | Leonard et al. | 525/245 |
| 5,051,468 | 9/1991 | Barnum | 525/61 |
| 5,051,529 | 9/1991 | Witzeman et al. | 525/386 X |
| 5,102,951 | 4/1992 | Kei et al. | 525/61 |
| 5,145,910 | 9/1992 | Wang | 525/61 |
| 5,196,394 | 3/1993 | Nakazawa et al. | 503/209 |
| 5,219,930 | 6/1993 | Chang | 525/387 |
| 5,288,802 | 2/1994 | Walters | 525/113 |

FOREIGN PATENT DOCUMENTS 1-34245  7/1989  Japan .

*Primary Examiner*—Judy M. Reddick
*Attorney, Agent, or Firm*—Russell L. Brewer; William F. Marsh

[57] ABSTRACT

This invention relates to an improved process for the production of polyvinyl alcohol containing keto-ester groups wherein a polymer containing polyvinyl alcohol units is contacted with a compound having keto-ester forming groups under conditions for forming keto-ester groups on the polymer. The improvement in the process comprises:

contacting a solid polymer containing vinyl alcohol units with a liquid phase acetoacetate of the formula:

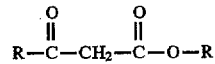

where R is chosen independently from alkyl groups under conditions for converting the alcohol functionality to the keto ester form; and then, removing unreacted acetoacetate forming group and volatile byproduct alcohol from the solid polymer.

5 Claims, No Drawings

PROCESS FOR MANUFACTURING POLYVINYL ALCOHOL POLYMERS CONTAINING ACETOACETIC ESTER GROUPS

TECHNICAL FIELD OF THE INVENTION

This invention relates to a process for converting vinyl alcohol polymers to polymers containing acetoacetic ester groups.

BACKGROUND OF THE INVENTION

Partially hydrolyzed vinyl acetate polymers having keto-ester units are known and have been used as protective colloids in emulsion polymerization or as crosslinkers for thermal paper. The water-soluble polymers by virtue of their keto-ester groups provide cross linking capability by virtue of the active methylene group to provide thermoset characteristics to an otherwise water sensitive polymer. Representative patents showing partially hydrolyzed vinyl acetate polymers containing keto-ester units are as follows:

U.S. Pat. No. 5,051,468 discloses polymers having the general idealized structure:

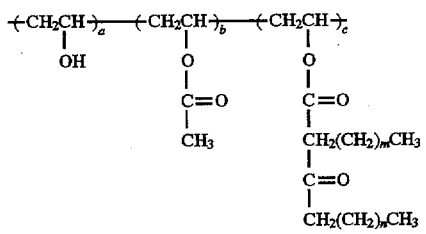

wherein a, b and c represent the number of monomer units and m and n are integers. The polymers are prepared by grafting alkyl ketene dimers to fully and partially hydrolyzed polyvinyl acetate polymers. They are used as crosslinkers for paper and stabilizers for emulsion polymerization.

Japanese Patent 1-34245, based on Application 55-115559, discloses a process for producing polyvinyl alcohol type resins containing acetoacetic ester units. The process involves adsorbing an organic acid into a polyvinyl alcohol resin powder to the maximum amount that can be occluded by the resin and then adding diketene to the resin powder under conditions for retaining the powder form. Unreacted diketene is removed via an evaporation process. The resins are used for a variety of applications which include photographic materials, paper reinforcement and the like.

U.S. Pat. No. 5,288,802 discloses a process for producing curable coating compositions containing an amine containing polyepoxide resin and acetoacetate containing polyester and a polyacrylate. The acetoacetate containing polyester for producing the automotive finish is prepared by mixing the polyester polyol with an acetoacetate containing material represented by the formula:

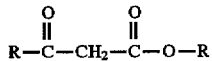

at elevated temperature. R in the above formula is an alkyl group having 1–10 carbon atoms. Tertiary-butylacetoacetate is a representative acetoacetate and is removed at elevated temperature under vacuum.

U.S. Pat. No. 2,536,980 discloses a process for producing keto-esters of polyvinyl alcohol polymer. The product is produced by isolating a polyvinyl polymer with 1-butene-1,3-diol, the reaction being carried in an inert solvent.

U.S. Pat. No. 5,219,930 discloses a process for converting vinyl alcohol polymers to poly(keto-esters) by reacting a vinyl alcohol polymer with an organic peroxy acid oxidizing agent in an inert liquid medium.

SUMMARY OF THE INVENTION

This invention relates to an improved process for the production of polyvinyl alcohol containing keto-ester groups wherein a polymer containing polyvinyl alcohol units is contacted with a compound having keto-ester forming groups under conditions for forming keto-ester groups on the polymer. The improvement in the process comprises: contacting a solid polymer containing polyvinyl alcohol units, e.g., hydrolyzed vinyl acetate groups as the polyvinyl alcohol with a liquid phase compound containing keto-ester groups of the formula:

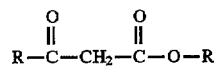

where R is chosen independently from alkyl groups, typically R having from 1 to 4 carbon atoms, preferably 1–4 carbon atoms under conditions for converting the alcohol functionality to the keto ester form; and then, removing unreacted liquid phase compound containing keto-ester groups and volatile byproduct alcohol from the solid polymer.

There are significant advantages of contacting a solid polymer containing polyvinyl alcohol units with a liquid phase acetoacetic ester forming unit represented by the above formula: to produce the vinyl alcohol/acetoacetic ester containing polymer. (For reasons of convenience, acetoacetate terminology has been used in reference to the generic phraseology liquid phase compound containing keto-ester groups.) These advantages include:

an ability to use an easily handled reactant such as tertiary-butylacetoacetate as the keto ester forming reactant, as opposed to the conventional reactant, diketene, which is explosive and difficult to handle;

an ability to maintain the polymer in solid form for easy handling while simultaneously converting a portion or all of the vinyl alcohol units, depending on the degree of hydrolysis to keto-ester form, namely the acetoacetic ester form; and, an ability to operate in the absence of solvents such as dimethylformamide which are difficult to remove from the product.

DETAILED DESCRIPTION OF THE INVENTION

Polymers, and productions methods for producing polymers containing vinyl alcohol units are well known. Typically, these polymers are prepared by forming a polymer containing polymerized vinyl ester groups, e.g., polymerized vinyl acetate groups and then hydrolyzing the ester group to the alcohol group. Often the vinyl esters are polymerized with other copolymerizable monomers, e.g., $C_{1-6}$ alkyl esters of acrylic and methacrylic acid, vinyl chloride, ethylene, propylene, styrene; unsaturated carboxylic acids such as crotonic acid and acrylic or methacrylic acid. The degree of hydrolysis of the ester group is often controlled to achieve a certain ester/alcohol ratio which has been preselected for a specific end use application. As with the degree of hydrolysis, the monomers in the copolymers and interpolymers are present in a preselected ratio to achieve the desired end properties required for the application. Typical degrees of hydrolysis range from about 60 to 95%.

Transesterification of the vinyl alcohol group in the polymer is carried out by contacting the polymer in solid phase form with a liquid acetoacetate capable of converting the alcohol group to an acetoacetate group. The liquid phase containing compositions which can be used as the keto ester forming composition is represented by the formula:

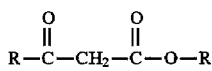

wherein R is an alkyl group having 1–10 carbon atoms, preferably having from about 1 to 4 carbon atoms. The preferred acetoacetate composition is t-butylacetoacetate.

Reaction of the acetoacetate forming composition with the solid phase polymer containing vinyl alcohol is accomplished by spraying the acetoacetate forming composition onto the solid polymer at temperatures ranging from about 120° to 150° C. The polymer, in contact with the acetoacetate forming composition generates an acetoacetate group on the solid phase vinyl alcohol containing polymer and generates by product alcohol, e.g., tertiary butyl alcohol as a byproduct. Contact periods range from about 0.5 to 4 hours. Once the reaction is complete, residual unreacted acetoacetate forming material and byproduct alcohol, e.g., tertiary-butyl alcohol are removed. This can be accomplished easily when then the keto ester forming material and byproduct alcohol are volatile. When t-butylacetoacetate is used, both the reactant and byproduct alcohol are volatile and these components can be removed by passing the solid phase polymer containing the volatile components into a vacuum chamber and evaporating the volatile acetoacetate containing material and byproduct alcohol.

The achievement of water resistance in partially hydrolyzed polyvinylacetate is obtained through the cross-linking via the active methylene group on the acetoacetate moiety. Typically, the hydroxyl groups will be present in a proportion of from about 100 to 2000 hydroxyl groups per 1000 number average molecular weight polyvinyl alcohol. The stoichiometry of the reaction should be sufficient to provide about 1 to 10 keto ester (acetoacetate groups) forming groups per equivalent hydroxyl group. For preferred results the stoichiometry is from 1 to 5 acetoacetate groups per 100 hydroxyl groups.

The following examples provided to illustrate an embodiment of the invention and is not intended to restrict the scope thereof.

EXAMPLE 1

PREPARATION OF t-BUTYLACETOACETATE CONTAINING POLYMER 50 grams (g) (1.2 mole) of a fine grade of polyvinyl alcohol (PVOH) with a degree of hydrolysis of 87% and a molecular weight ≈116,000 (number average) (sold under the trademark AIRVOL® 523 from Air Products and Chemicals was charged to a high intensity jacket having a Littleford mixer. To the PVOH, while under agitation, was added 9.066 (0.13 mole) of tertiary butyl acetoacetate (t-BAA) and 1.14 g of acetic acid. The mixture was heated to 120° C. via high mixing and jacket heat for 3 hours. After 3 hours, the mixture was cooled to room temperature and tested for percent acetoacetate via NMR and by crosslinking at room temperature via addition of external crosslinker. Testing showed the presence of acetoacetate groups.

EXAMPLE 2

100 g (2.27 mole) of a 107 was placed in a Littleford high intensity mixer with jacket heat fully hydrolyzed polyvinyl alcohol with mw of 37,000 (number average) sold under the trademark Airvol®107. The powder was heated to 100° C. via mixing and external heat in order to open the porosity of PVOH. To the heated powder was then added 18 g (0.026 mole) of t-BAA and 5 g of acetic acid over a period of 2 hr. The reaction mixture was then kept at 120° C. for 2 hr. after which the reaction mixture was cooled to room temperature. The reaction mixture was then tested for percent acetoacetate via NMR and by means of a crosslinking reaction. Testing showed the presence of acetoacetate groups.

TEST PROCEDURE 30 g of a 10% water solution of modified polyvinyl alcohol was adjusted to pH≈3. Then, to the mixture was added 2 g of a Resimene polymer and a melamine formaldehyde product from Monsanto. The time required to gel the solution was recorded as the crosslinking reaction rate and that time was compared to unmodified PVOH. The table below sets forth the results.

|  | Viscosity (cps) | | | | |
| --- | --- | --- | --- | --- | --- |
|  | 1/2 | 1 hr. | 2 hr. | 3 hr. | 5 hr. |
| A-523 ® | 1000 | 1020 | 1030 | 2000 | — |
| A-523 ® (modified) | 1442 | 2420 | gel | gel | |
| A-107 ® | 46 | 46 | 46 | 46 | — |
| A-107 ® (modified) | 46 | 104 | 130 | 2000 | |

Fully hydrolyzed polyvinyl alcohol, such as Airvol 107, may require a solvent to open the porosity of PVOH and fully hydrolyzed polyvinyl alcohols are more difficult to react with t-butyl acetoacetate.

The results show the modified polyvinyl alcohol reacted with the crosslinking resin thus showing that some of the alcohol groups had been converted to acetoacetate groups by the process of contacting with t-butyl acetoacetate.

What is claimed is:

1. In a process for the production of polymer containing polyvinyl alcohol groups and keto-ester groups wherein a polymer containing vinyl alcohol units is contacted with a compound capable of converting the alcohol group to keto-ester groups under conditions for forming keto-ester groups on the polymer, the improvement in the process for forming keto-ester groups which comprises:

contacting a solid polymer containing vinyl alcohol units with a liquid phase compound of the formula:

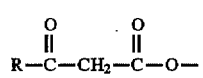

where R is an alkyl group under conditions for converting the alcohol functionality to the keto ester form and wherein said solid polymer is maintained in a solid state and then, removing unreacted liquid phase compound and volatile byproduct alcohol from the solid polymer.

2. The process of claim 1 wherein R is an alkyl group having from 1 to 4 carbon atoms and said solid polymer is polyvinyl alcohol.

3. The process of claim 2 wherein the liquid phase compound is t-butylacetoacetate.

4. The process of claim 3 wherein the hydroxyl groups in said solid polymer are present in an amount from about 100 to 2000 per 1000 number average molecular weight of said solid polymer.

5. The process of claim 4 wherein the t-butylacetoacetate forming compound is present in an amount to provide from 1 to 5 acetoacetate groups per 100 hydroxyl groups.

* * * * *